Aug. 21, 1945.   C. P. HEINTZE   2,383,385
JET PROPULSION POWER PLANT
Filed Nov. 10, 1941   2 Sheets-Sheet 1
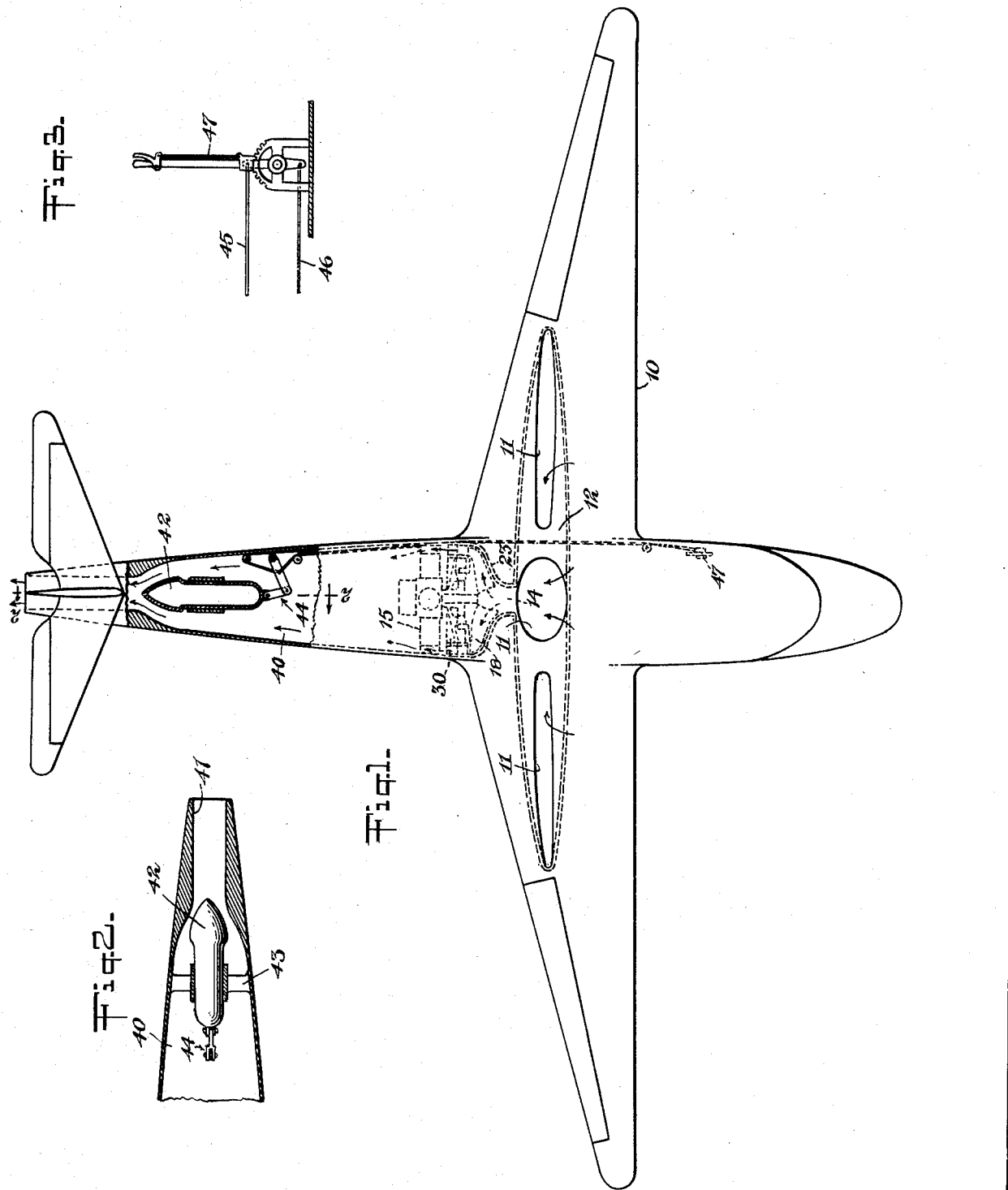
WITNESSES
INVENTOR
Carl Paul Heintze
BY
Munn, Liddy, Glaccum & Kane
ATTORNEYS

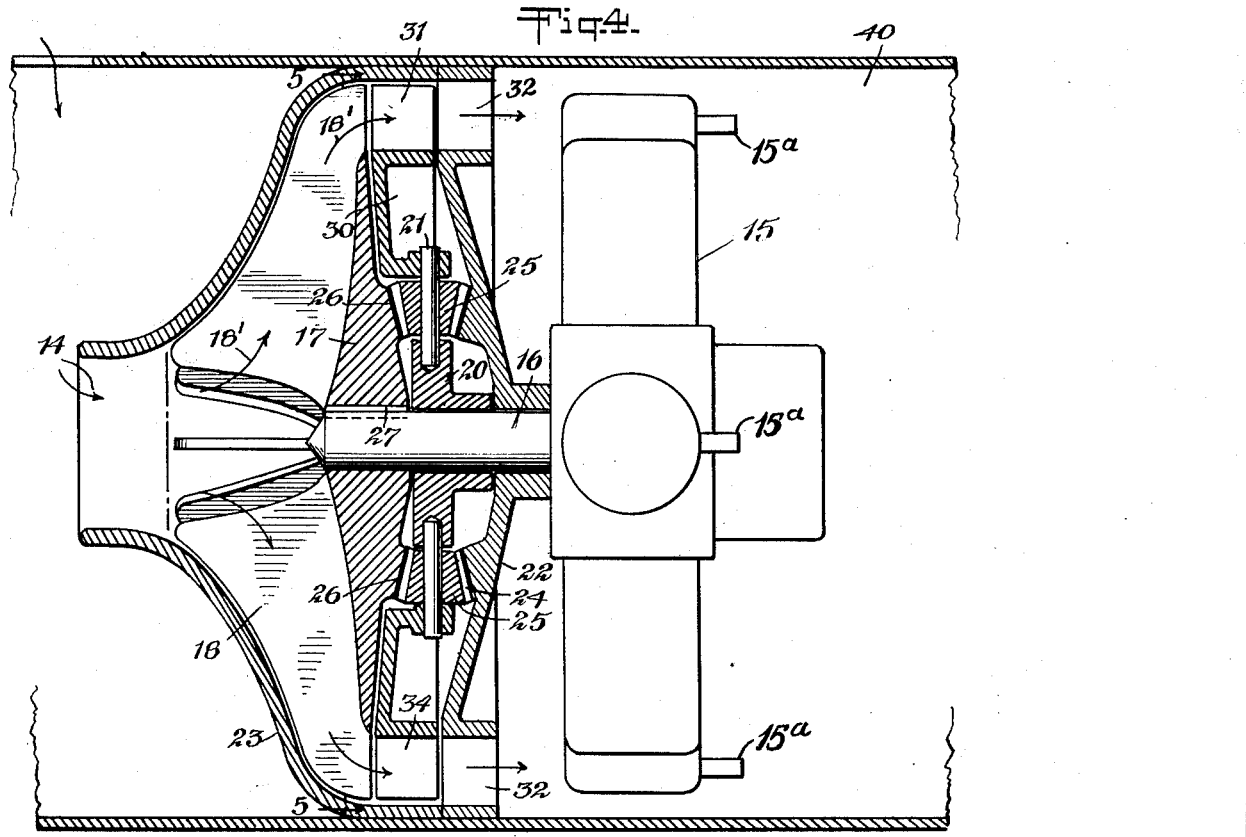
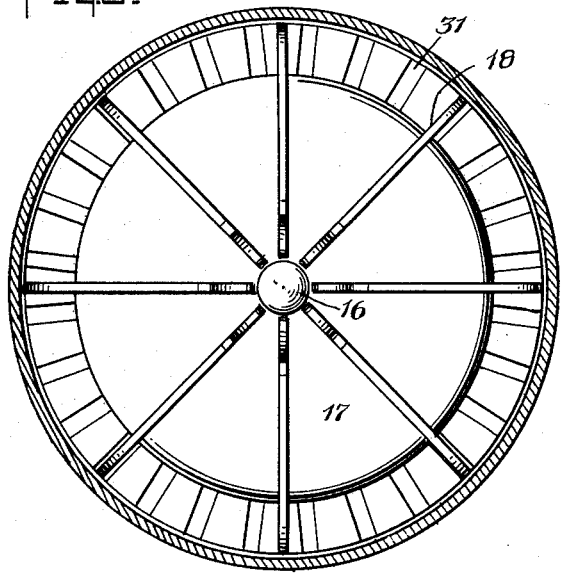
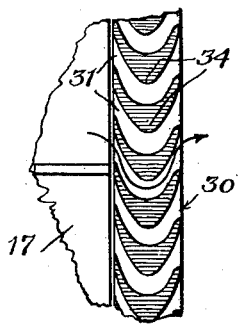

Patented Aug. 21, 1945

2,383,385

UNITED STATES PATENT OFFICE 2,383,385

JET PROPULSION POWER PLANT

Carl Paul Heintze, Amityville, N. Y.

Application November 10, 1941, Serial No. 418,486

1 Claim. (Cl. 60—35.6)

This invention relates to improvements in air jet propulsion power plants for airplanes and similar craft.

An object of the invention is to increase the power efficiency of such power plants to provide means for propelling the aircraft with relatively less horsepower than necessary where the usual jet propulsion is used.

A further object is to utilize the air not only in propelling through a reaction nozzle but also for cooling the motor.

A still further object is to make use of the exhaust gases of the motor to increase the efficiency of operation.

Where the conventional propeller is used, the thrust force is anchored directly to the surfaces of the propeller and is physically bound to act vertically through the disk described by the propeller. The propeller disks therefore must be essentially vertical to the line of flight and the air must flow into the propellers in a line opposite to the direction of flight.

An object of this invention is to provide means whereby the air may be taken into the power plant from any angle without obliteration or reversal of the jet thrust.

Other objects and advantages of my invention will become apparent as the description proceeds.

Reference is had to the accompanying drawings, in which—

Fig. 1 represents a somewhat diagrammatic view of an airplane embodying my invention;

Fig. 2 is a view taken on the line 2—2 of Fig. 1 of a type of reaction nozzle which may be used with my invention;

Fig. 3 is a view of mechanism which may be used to control the reaction jet;

Fig. 4 is a detailed view in section of my air jet propulsion power plant;

Fig. 5 is a cross-sectional view taken on the line 5—5 of Fig. 4;

Fig. 6 is a detailed view in section of a type of rotor which may be used in my construction.

I wish to point out that the construction shown in the drawings is rather schematic and that various changes and adaptations of the principles of my invention may be freely made to adapt it to particular constructions and uses. The illustration and description is therefore in the nature of an example of the use of the principles.

In Fig. 1 the plane 10 is provided with air intakes 11 which may be at the top, bottom and sides of the body and along the wing. It will be appreciated that these air intakes may be placed at any convenient position since the direction of the flow of air at this point is not controlling on the operation of my power plant.

An air intake chamber 12 is situated within the fuselage of the plane and leads to a passage 14 in the power plant. The power plant consists of a motor 15 which may be either air-cooled or liquid-cooled. In my drawings I have indicated a typical radial air-cooled motor.

Mounted on the shaft 16 of the motor 15 is a centrifugal compressor 17 provided with impeller blades 18. As the compressor is rotated, air drawn in through the air intakes will enter the passage 14 and follow the path of the arrows 18'.

Mounted on the shaft 16 is a hub 20 carrying the pins 21. The inner edge of the back 22 of the plant housing 23 is provided with teeth 24 adapted to engage a beveled gear 25 mounted on one of the pins 21. Similar teeth 26 on the back of the compressor also engage the gear 25. Any suitable number of gears 25 may be used.

The pin 21 at its outer edge engages the turbine rotor 30 which has a series of openings 31 therethrough. The openings 31 lead to the passage 32 and are curved in shape (as shown in Fig. 6) having a high point at the opening and exit thereto and a low point 34. These openings in the rotor 30 communicate through the passage 32 with the chamber 40 and direct the passage of air over and around the motor 15. As shown in the drawings, the compressor is keyed to the shaft 16 at 27 and the hub 20 is free to rotate upon the shaft. It is essential that the gearing system used be such that the rotor operates at a considerably lower speed than the compressor, and the most efficient ratio would be a two-to-one gearing whereby the compressor 17 would operate at twice the speed of the rotor 30.

A reaction nozzle 41 at the rear of the plane provides for the escape of the air to propel the plane. Any type of valve (such as that shown in Fig. 2 and identified by the numeral 42) may be used to control the reaction nozzle. As shown in the drawings, the valve 42 is mounted in a frame 43 and is provided with a lever mechanism 44 controlled by the cables 45 and 46 and the operating handle 47 to control the position of the valve.

While the essential principle of my invention lies in the use of a centrifugal compressor as a jet generating means in combination with the reaction nozzle and the directing of the air stream over and through the motor, I also provide means to compensate for the loss of power. It will be understood that as the air is sucked in through the passage 14 by the compressor 17 it is forced through the openings 31 by the turbine rotor 30. Since the turbine rotor 30 operates at approximately half the speed of the compressor, power will be returned through the planetary gears through the compressor to enable its speedy operation, and there will be less power lost than in the usual compressor. As the air is forced through the passages 31 in the rotor blades and compressed into the chamber 40, it at the same time passes through and around the cylinders of the engine 15, picks up and absorbs the exhaust gases which are emitted from the exhaust ports 15a, and the heat therefrom is used to increase the pressure in the chamber 40 and is eventually transformed into mechanical power.

I claim:

A jet propulsion power plant including a reaction nozzle, a compression chamber communicating with said reaction nozzle, and an inlet opening to said chamber, an internal combustion engine mounted in said chamber, its exhaust ports opening into said chamber in the direction of the reaction nozzle, an elongated shaft on said engine, a centrifugal compressor mounted on the end of said shaft adjacent the inlet opening of said chamber, said compressor having radially positioned gear teeth formed in its back, a stationary gear wheel mounted coaxially with said compressor between said compressor and the engine, a turbine rotor rotatably mounted on said shaft between said compressor and said stationary gear wheel, said turbine rotor having turbine blades peripherally mounted thereon to receive the flow from the compressor, said turbine rotor also having planetary gear wheels radially mounted therein and meshing with the stationary gear wheel and with the gear teeth of the compressor, whereby some of the power transmitted by the engine through the shaft to the compressor is returned to the shaft by the flow from the compressor to and through the turbine rotor.

CARL PAUL HEINTZE.